United States Patent [19]

Marto

[11] Patent Number: 4,723,933
[45] Date of Patent: Feb. 9, 1988

[54] PTO LINEAR CONTROL LATCH

[75] Inventor: John H. Marto, Oshkosh, Wis.

[73] Assignee: Ingersoll Equipment Co., Inc., Winneconne, Wis.

[21] Appl. No.: 10,066

[22] Filed: Feb. 2, 1987

[51] Int. Cl.$^4$ .............................................. G05G 5/06
[52] U.S. Cl. ...................................... 474/135; 74/527; 74/97; 192/99 S
[58] Field of Search .............. 74/527, 97 P; 192/99 S; 474/133, 135

[56] References Cited

U.S. PATENT DOCUMENTS

| | | | |
|---|---|---|---|
| 2,461,391 | 2/1949 | Osterhaus | 474/135 X |
| 2,474,085 | 6/1949 | Albright | 474/133 X |
| 2,505,277 | 4/1950 | Ciaccio | 474/133 |
| 3,261,931 | 7/1966 | Golbeck et al. | 74/527 X |
| 3,372,606 | 3/1968 | McGrath et al. | 74/527 X |
| 4,078,449 | 3/1978 | Kelly | 74/527 |

Primary Examiner—Allan D. Herrmann
Attorney, Agent, or Firm—Cullen, Sloman, Cantor, Grauer, Scott & Rutherford

[57] ABSTRACT

A linear control latch assembly controls the clutching operation of a power take-off system. A driving means produces kinetic mechanical energy which is taken off by a power take-off means. Clutch means effects a union between the driving means and the power take-off means. A linear actuator operates the clutch means. The linear actuator is controlled by a crank arm cranked into operation by a control lever. The control lever is rotated before the crank arm rotates as a result of lost motion in the control system. The initial motion of the control lever is translated into a camming action that unlatches a latch plate prior to the rotation of the crank arm. When the latch plate is unlatched, it unlatches the crank arm to allow release of the clutch that effects the union between the driving means and the power take-off means.

13 Claims, 9 Drawing Figures

PTO LINEAR CONTROL LATCH

FIELD OF THE INVENTION

The present invention relates to latches for controls, particularly linear controls. More particularly, this invention relates to a linear control latch which holds a control in an "on" position against resisting forces.

BACKGROUND OF THE INVENTION

A tractor or a tractor-like vehicle is capable of performing one of a variety of work tasks when one of a variety of work implements, each of which is specially adapted to perform a particular task, is attached to the tractor. Some implements are passive and are attached to a tractor to be pulled or pushed along by the tractor, as for example, a plow is pulled along in a plowing operation. Some implements are powered by the tractor, aside from being locomated by it, as for example, a mower is powered to rotate its cutting blades so that they strike across and cut grass blades.

A belt-driven implement gets its power from a tractor by means of a driven endless belt that is received around a pulley for a power take-off assembly, or PTO, of a tractor. The belt is also trained around a drive pulley that is part of the tractor's driving means. The pulley for the PTO takes off kinetic mechanical energy produced by the driving means of the tractor.

Because a tractor must carry out operations other than to power an implement—for instance, in a mowing operation a tractor must travel to a worksite and, at the worksite, must maneuver to turn around and avoid obstacles when not mowing—it is advantageous to have the PTO tap into the tractor's driving means while the driving means is operating. One structure that is advantageous in this regard has the belt loosely trained around both the drive pulley and the PTO pulley, so that while the drive pulley is operating, no power is taken off by the PTO pulley because there is no effective union between the pullies. Intermediate the two pulleys is an idler pulley that can be clutched into the belt to tighten the belt for a positive, linear relationship between the power supplied to the PTO pulley and the power supplied by the drive pulley. Thus, a clutching operation allows the PTO to effect a union with the driving means to receive power from the driving means; in like manner, the clutching operation breaks the union and thereby cuts off power to the PTO.

It is conventional to turn "on" and "off" the supply of power to an implement by a hand control conveniently situated near the operator of the tractor to which the implement is attached. Of the different types of hand controls, including rotating wheels, it is most convenient to use controls that are manipulated along a substantially straight line and, therefore, the shortest distance between "on" and "off" positions. Such controls are simple, quick, and efficient and tend to be the last tiring to tractor operators. It is to be appreciated that when the idler pulley is clutched into the belt by the control being manipulated to an "on" position, the belt exerts an opposite force resisting the idler pulley. This force is translated throughout the system that links the control to the clutching operation.

It is also to be appreciated that, when the idler pulley is clutched into a driven drive belt, it will be subjected to strong vibrations of a number of frequencies, particularly if the contact between the belt and the idler pulley is not true. This would place strain on the system causing undue wear and tear of the system's parts. It is also the caste that, when the contact is not true, the efficiency of the power tap is lost, causing unnecessary consumption of fuel and a loss of work output, as for example when there is skipping in the cutting operation of a mower implement.

It is this particular concern about the forces operating on the system, particularly when a true contact is not provided between an idler pulley of a PTO and a power-driven belt of a tractor, that focuses an important object of the present invention. The object is to provide an improved method of latching a linear control into an "off" or "on" position, thus keeping the vibrational frequencies to a minimum by keeping the contact between the component parts true and, thus, avoiding over-stressing the components of a PTO system. It follows that another object of the invention is to provide an improved linear control latch that utilizes the method.

SUMMARY OF THE INVENTION

The present invention, in its preferred embodiment, is a linear control latch for use in a PTO system for a tractor that utilizes an implement to perform a specific work task and that provides power to the implement by means of the PTO system. The invention accordingly includes a PTO control lever. The PTO control lever is made up of a crank shaft pivotally mounted at an axis along which it extends and a crank rigidly connected to the crank shaft. A rotation of the crank has the consequence of producing a pivoting of the crank shaft. Also rigidly connected to the crank shaft, at another position along its axis of extension, is a slider. In response to the pivoting of the crank shaft, the slider, which extends radially of the crank shaft, also rotates. Perpendicularly connected to the slider, at a position remote from the crank shaft, is a cam pin. The cam pin rotates in a camming path about the crank shaft concomitantly with the rotation of the slider.

A latch plate generally extends in a plane at a location also remote from the crank shaft so that it is adjacent the cam pin. The latch plate has two ends, one end having a pivot axis about which the latch plate is capable of rotating. This pivot axis is parallel to the extension of the cam pin. The other end is biased, for example by an extension spring, to a latch position.

The latch plate has an opening with a stop edge and a latch edge. The edges are generally parallel to each other and to the pivot axis, which is situated closer to the stop edge than to the latch edge. The opening is capable of receiving an upper portion of the slider. The slider thus is rotatable in a first direction as its upper portion passes through the opening until an edge of the slider contacts the latch edge of the opening. The slider is rotatable in a second direction only until a second edge of the slider contacts the stop edge of the opening.

The latch plate also has a lifting ramp and a nesting ramp, which are aligned end-to-end along a cam follower path on the latch plate beside the opening. The cam follower path is generally tangential to the camming path. Both the lifting ramp and the nesting ramp are angled outwardly from the latch plate generally toward the crank shaft in an arrangement in which the lifting ramp and the nesting ramp have their joining ends away from the latch plate.

By the foregoing arrangement, when the cam pin rotates about the crank shaft in the first direction and the latch plate is an initial latch position to which it is biased, the cam pin encounters the lifting ramp and slides along the lifting ramp in pressing engagement with it. This pressing engagement rotates the latch plate from the initial latch position. During this part of the operation, the latch plate rotates in a sense opposite the first direction until the cam pin encounters the nesting ramp, whereupon the cam pin slides along the nesting ramp and allows the latch plate, under the influence of the extension spring, to rotate in the sense of the first direction. The rotation in the first direction can continue until the slider encounters the latch edge of the opening in the latch plate.

When the cam pin rotates in a second direction, the cam pin first encounters the nesting ramp and pressingly engages it. The cam pin slides along the nesting ramp and rotates the latch plate in the sense of the second direction until the cam pin encounters the lifting ramp, whereupon the cam pin slides along the lifting ramp and allows the latch plate to rotate in the sense opposite the second direction. Rotation continues in the second direction until the cam pin moves out of contact with the lifting ramp, and eventually the slider encounters the stop edge of the opening.

A bell crank lever is pivotally mounted on the crank shaft and extends in opposite radial directions from the crank shaft. The bell crank lever has a connection end for connecting the bell crank to a clutch linkage. It also has a latch end that is received through the opening of the latch plate when the latch plate is in the latch position. The latch end includes a cam notch that partially surrounds the cam pin with sufficient tolerance to allow the cam pin to rotate within the notch before coming into contact with an edge of the notch. When the cam pin rotates and comes into contact with an edge of the notch, the bell crank lever rotates with the cam pin.

The latch end also has a latch notch that is configured to receive the latch edge of the latch plate opening, in intimate contact with it. This intimate contact takes place when the latch plate is in a latch position, so that the bell crank lever is prevented from rotating in the first direction. The latch notch is disposed at the latch end at a location more remote from the pivot axis than the cam notch.

The method used by this control latch apparatus employs the rotation of the control lever in a first direction to cause concomitant rotation of the slider and the cam pin. The cam pin initially rotates within the cam notch while causing the latch plate to pivot from a latch position by pressing against it. When the latch plate moves from the latch position, the bell crank lever is not prevented from rotating in the same direction, so that when the cam pin eventually comes into contact with an edge of the cam notch, the PTO control lever, the slider, the cam pin, and the bell crank continue to rotate until the first edge of the slider comes into contact with the latch edge. When the PTO control lever is rotated in the second direction, it causes concomitant rotation of the slider and the cam pin, with the cam pin initially rotating within the cam notch. The cam plate is rotated by the pressing engagement of the cam pin which eventually comes into contact with an edge of the cam notch. At the latter event, the PTO control lever, the slider, the cam pin, and the bell crank lever all rotate together, with the cam pin eventually coming out of contact with the latch plate and the latch plate rotating in a sense opposite the second direction to fall into the latch position.

Advantages and meritorious features of the linear control latch will be fully understood from the following description of the preferred embodiment, the appended claims, and the drawings, a brief description of which follows.

DETAILED DESCRIPTION OF THE PREFERRED EMBODIMENTS

Figure 1:
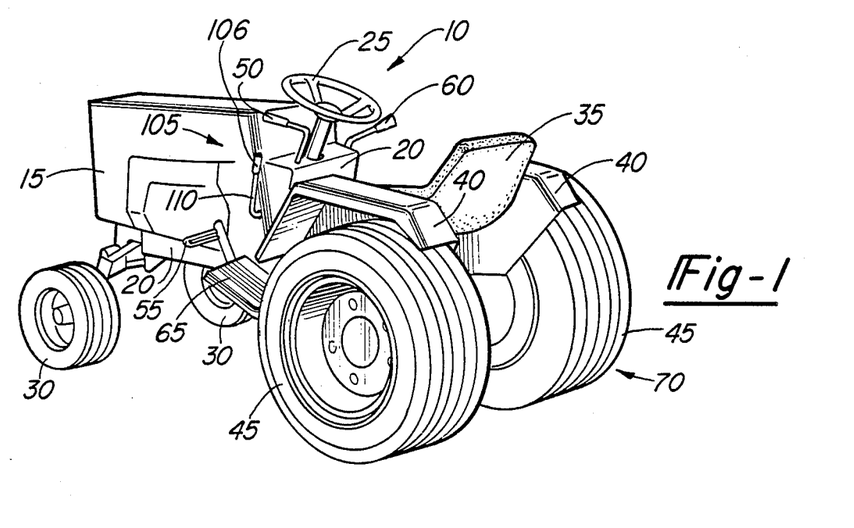
FIG. 1 is a perspective view of a tractor vehicle.

A preferred embodiment of the tractor vehicle 10, including an attachment drive power take-off (PTO), made in accordance with the teachings of the present invention, is illustrated in FIG. 1. The tractor 10, as shown in FIG. 1, is seen to include a main frame 20 supporting a hood 15 forwardly of the main frame 20. As is well-known, the tractor includes a steering wheel 25, which guides a pair of front wheels 30. An operator's station 35 is situated rearwardly of the hood 15. The operator's station 35 is flanked by a pair of fenders 40. Beneath each fender is a drive wheel 45. In a standard proximity to the operator's station 35 are conventional controls such as a gear shift lever 50 and a clutch pedal 55. A special control 60 for operating an implement lift, as disclosed in a copending application filed under Ser. No. 046,478 and assigned to Ingersoll Equipment Company, is also shown in proximity to the operator station 35 as a part of the complement of controls. A foot rest 65 is provided adjacent the clutch pedal 55. The complement of controls in proximity to the operator's station also includes a PTO lever handle 106, which is part of an assembly that will now be discussed in greater detail with reference to all of the drawings.

Figure 2:
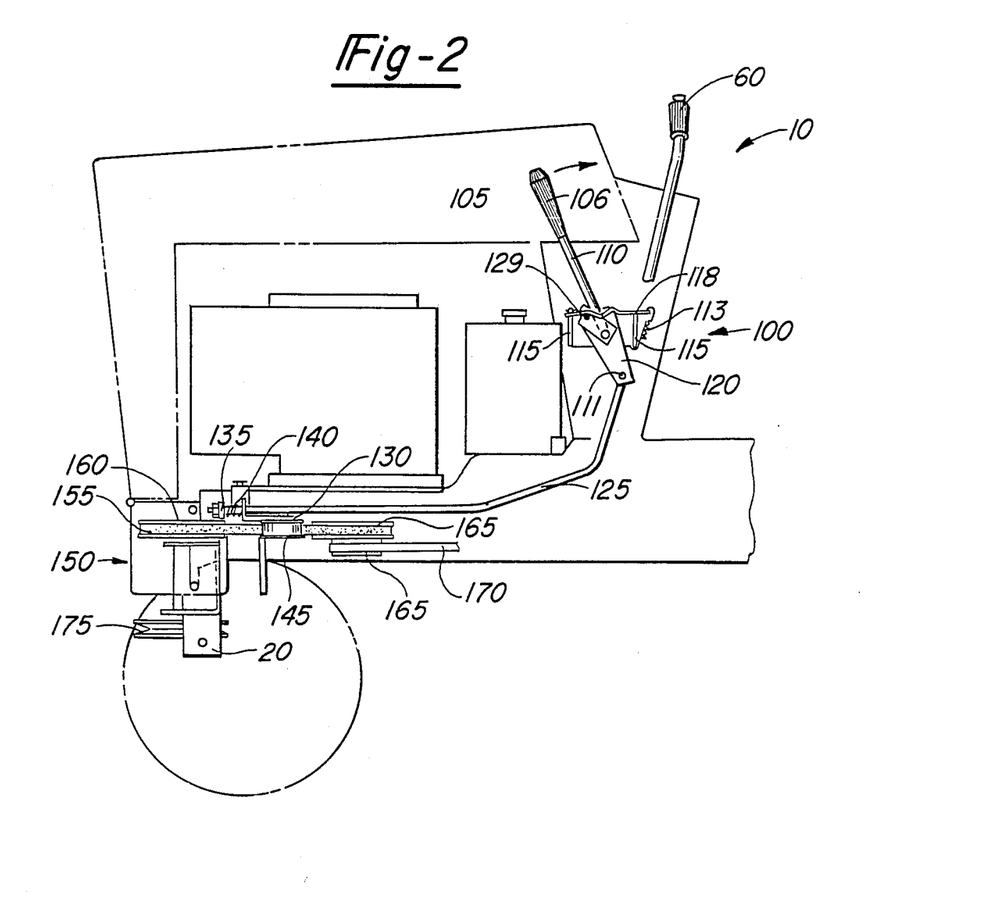
FIG. 2 is a partial side view of the PTO, with a phantom of the tractor front end including the hood, front wheel, and main frame.

As viewed from the elevation shown in FIG. 2, a PTO linear control latch assembly 100 occupies the foreground, in front of the control 60 for operating the implement lift. The PTO lever handle 106 extends from the uppermost end of a crank 110. The PTO lever handle 106 and the crank 110, together with a crank shaft 111, form the structure of a PTO control lever 105. Mounting the crank 110 is a housing 115 which functions as a support bracket. A bell crank lever 120 extends downwardly from the lower end of the crank 110 as shown in this view. Also, as shown in this view, a PTO clutch rod 125 extends still further in the downward direction from where it is articulatedly connected to the bell crank lever 120 for relative movement therewith. The downward extension of the PTO clutch rod 125 is, first, in a plumb direction; then, the PTO clutch rod 125 angles still further downwardly; and, finally, it extends in a substantially horizontal direction from the midsection of the tractor 10, proximate to the operator station 35, toward the front of the tractor 10, where it is linked to an idler arm or clutch arm 130 by a nut and bolt assembly 135 and a compression spring 140.

The idler arm or clutch arm 130 and a clutch pulley 145, shown below the idler arm 130, provide clutch means to transfer kinetic mechanical energy from a PTO system 150. The PTO system 150 includes a PTO top pulley 160 which has an endless PTO belt 155 trained around it. The PTO belt is also trained around a drive pulley 165, which is driven by the engine of the tractor 10. Also included in the PTO system 150 is a bottom pulley 175, shown below the top pulley 160 and partially hidden by the structure of the main frame 20.

Figures 3, 4, 5, 6:
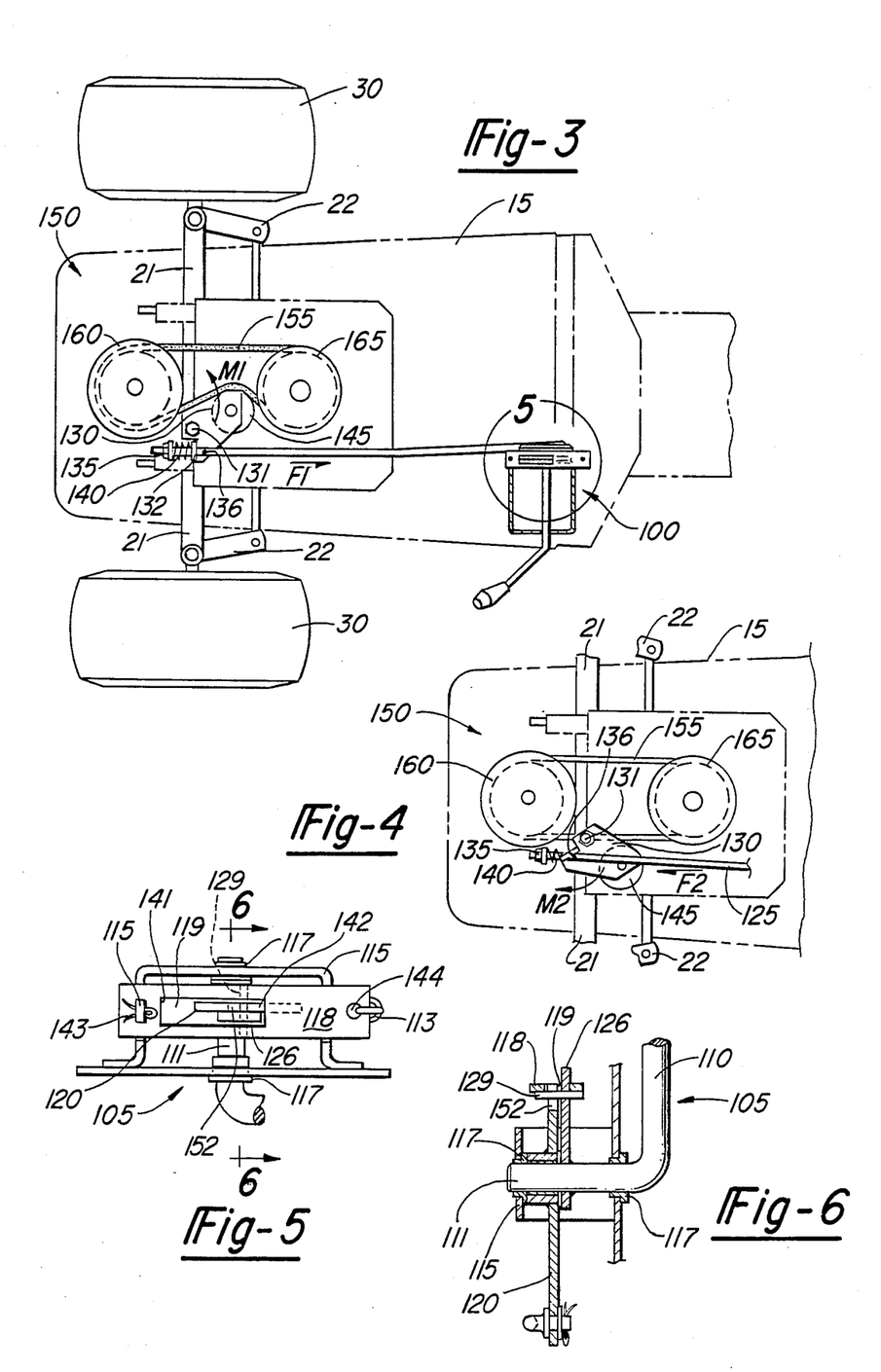
FIG. 3 is a partial top, plan view of the PTO and front end structure, with a phantom of the tractor's hood and main frame, showing the idler pulley of the PTO assembly engaged with the PTO belt.
FIG. 4 is a partial top, plan view of the system shown in FIG. 3, showing the idler pulley of the PTO assembly out of engagement with the PTO belt.
FIG. 5 is a top view of the linear control latch.
FIG. 6 is a sectional view of the linear control latch, taken along line 6—6 of FIG. 5.

With particular reference to FIG. 3, which shows the front end of the tractor in relationship to the hood 15, the front wheels 30, and an axle 21 supporting the front wheels, with a steering linkage 22 for turning them, the relationship between the drive pulley 165 and the top pulley of the PTO system 160 can be better appreciated. The PTO belt 155 is shown in a taut condition facilitated by the pressing engagement of the clutch pulley 145. The clutch pulley 145 is positioned accordingly by the idler arm 130. The idler arm 130 is pivotally mounted by a carriage bolt 131 so that it can rotate into pressing engagement with the PTO belt 155 and rotate out of that position. A force exerted on a flange 132 results from the clutch rod having been pulled in the direction and sense of the force F1, compressing the compression spring 140. This force causes a counterclockwise moment M1 to be exerted on the idler arm 130. A predetermined spring force of the compression spring 140 maintains a proper engagement of the clutch pulley 145 to the PTO belt 155. The spring 140 also allows for absorption of vibrations that amplify a force tending to kick the clutch pulley out from the taut belt 155.

FIG. 4 shows the results of movement of the clutch rod in an opposite direction so as to exert a force F2, having the sense and direction shown in the figure, upon the flange when a spiral pin 136 contacts the flange of the idler arm 130. This produces a clockwise moment M2 rotating the clutch pulley away from its engagement with the PTO belt 155. The compression spring 140 is also released to nullify the predetermined force of the compression spring 140 so that the PTO control latch assembly 100 is under a "no load" condition whereby no force is exerted on the system, other than the force applied to a latch plate 118 by an extension spring 113 in a manner to be explained with particular reference to FIGS. 7 and 8. The cooperative structure that has the compression spring 140 and the spiral pin 136 alternatively contacting the flange of the idler arm 130 allows for clutch rod 125 to travel a minimum distance to effect "on" and "off" operations of the PTO systems.

Referring again to FIGS. 2 and 3, the PTO clutch rod 125 is shown to be connected to the linear control latch assembly 100. The assembly is shown more particularly in FIGS. 5-8, to which reference will now be made.

Figures 7, 8:
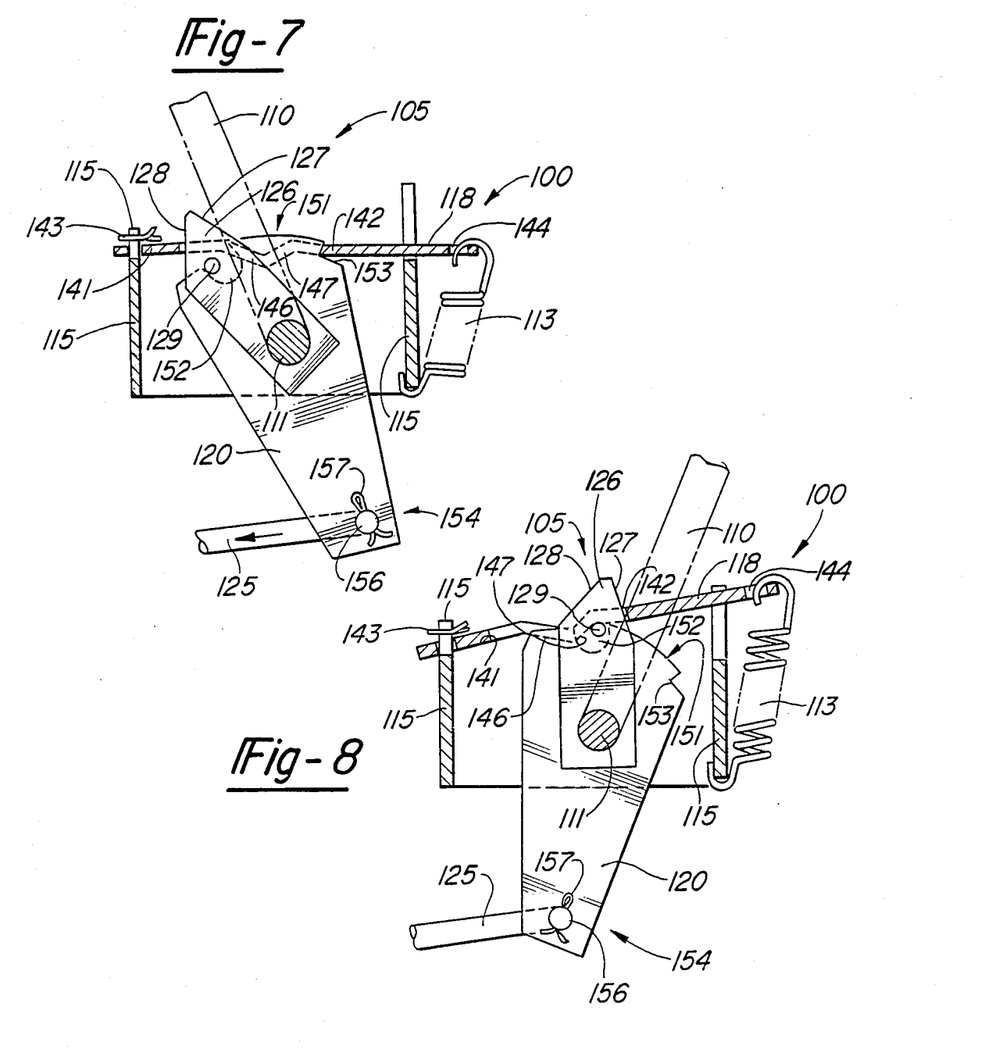
FIG. 7 is a sectional view of the linear control latch in an "on" position.
FIG. 8 is a side sectional view of the linear control latch in an "off" position.
Figure 9:
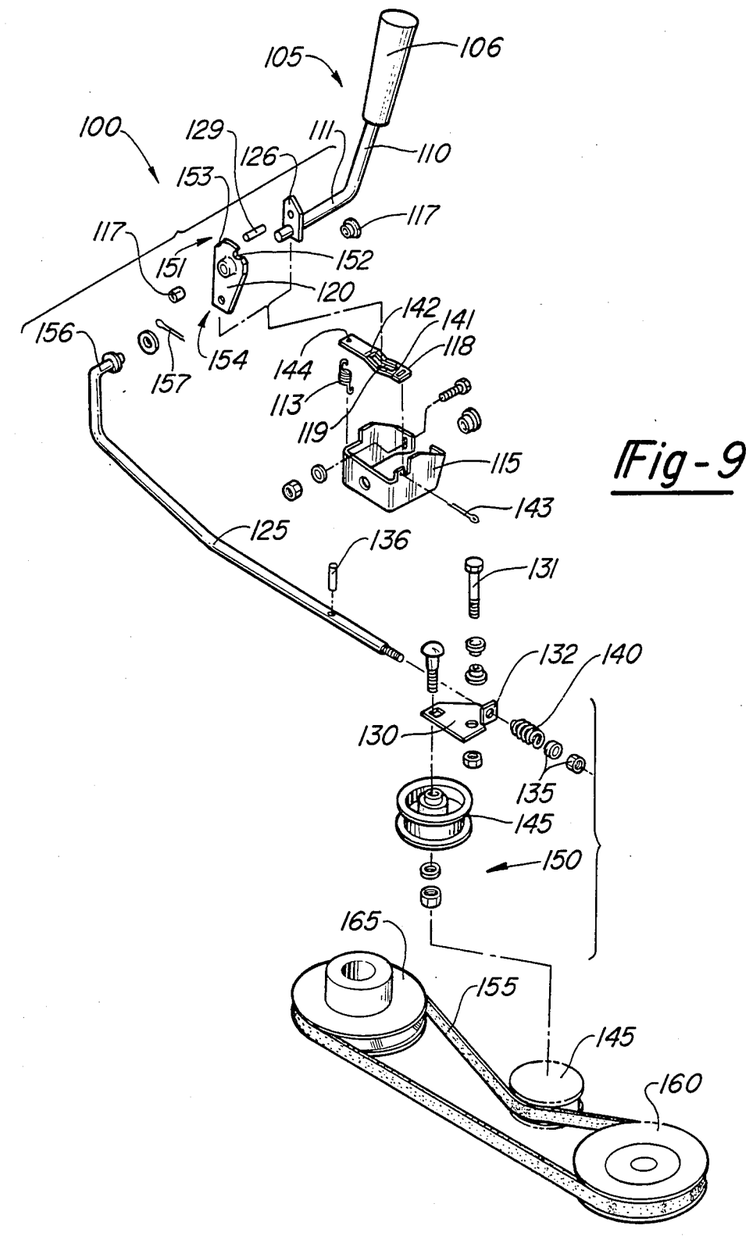
FIG. 9 is an exploded perspective view of the attachment drive take-off (PTO).

The crank shaft 111 of the PTO control lever 105 is shown in FIGS. 5, 6 and 8 to be pivotally mounted in bushings 117, the crank shaft 111 extending along its pivot axis. The crank 110 is integrally connected to the crank shaft 111 at substantially a 90° angle, so that, when the crank 110 is rotated between the positions shown in FIGS. 7 and 8, the crank shaft 111 pivots coincidentally. A slider 126 is rigidly connected to the crank shaft 111 to rotate with the pivoting of the crank shaft 111. The slider 126 extends radially of the crank shaft 111 to a wedge-shaped upper portion which has a first edge 127 and a second edge 128. In proximity to the wedge-shaped portion of the slider 126 is a cam pin 129, which is perpendicularly connected to the slider 126 at a position remote from the crank shaft 111. Consequently, when the slider 126 rotates with the pivoting of the cam shaft 111, the cam pin 129 rotates in a camming path about the crank shaft 111.

A latch plate 118 is shown in FIGS. 7 and 8 as generally extending in a plane at a location remote from the crank shaft 111. The latch plate 118, which is situated adjacent the cam pin 129, has two ends. One of the ends has a pivot axis, about which the latch plate is rotatable. The pivot axis is facilitated by an extension of a housing 115 through the latch plate to form thereby a loose connection anchored by a cotter pin 143. This pivot axis formed by the loose connection is, in general, parallel to the extension of the cam pin 129 from the slider 126. The other end of the latch plate 118 has a circular opening 144 to accommodate the hook of an extension spring 113, which resists rotation of the latch plate 118 away from its rest position as will be shown to be its latch position on the housing 115.

As can be seen best in FIG. 5, the latch plate 118 has a rectangular, generally elongate opening 119. At one end of the longitudinal extension of the opening 119 is a stop edge 141. At the other end is a latch edge 142. These edges are generally parallel to each other and to the pivot axis. As can be seen in FIGS. 7 and 8, the opening receives through it the upper portion of the slider 126, enough of the upper portion so that the slider is rotatable in a first, clockwise direction until the first edge 127 of the slider 126 contacts the latch edge 142 of the opening. The slider is also rotatable in a counterclockwise, second direction until the second edge 128 of the slider 126 contacts the stop edge 141 of the opening.

The latch plate 118 has adjacent the cam pin an undersurface that has projecting from it a lifting ramp 146 and a nesting ramp 147, as is shown in FIGS. 7 and 8. The lifting ramp 146 and the nesting ramp 147 are aligned end-to-end along a cam follower path on the latch plate 118. The alignment is along one side of the opening 119, between the two ends thereof. Both the lifting ramp 146 and the nesting ramp 147 are angled outwardly from the plane in which the rest of the undersurface of the latch plate 118 generally lies, generally toward the crank shaft 110. The lifting ramp 146 and the nesting ramp 147 are arranged such that they are joined end-to-end away from the plane.

When the cam pin 129 rotates along its cam path in the first direction, which is clockwise as shown in FIGS. 7 and 8, the cam pin encounters the lifting ramp 146. After encountering the lifting ramp 146 the cam pin 129 slides along the lifting ramp 146 in pressing engagement with it. The pressure of the cam pin upon the lifting ramp 146 rotates the latch plate 118 from its latch position. At the time the cam pin 129 is in pressing engagement with the lifting ramp 146, the latch plate rotates in a sense opposite the first direction, which, with respect to FIGS. 7 and 8, is a counterclockwise rotation, until the cam pin 129 reaches the joinder of the lifting ramp 146 and the nesting ramp 147, whereupon the cam pin begins to slide against the nesting ramp 147.

The latch plate 118 rotates back in the direction of the rotation of the cam pin 129, that is, in FIGS. 7 and 8, the clockwise direction, under the influence of the extension spring 113 and continues to rotate in the first direction until the first edge 127 of the slider 126 contacts the latch edge 142. The relationship of the cam pin 129, the slider 126, the crank 110, and the latch plate 118 are as shown in FIG. 8. The cam pin 129 is shown to nest at the joint between the nesting ramp 127 and the underside of the latch plate 118.

When the cam pin 129 rotates in the second direction, which is counterclockwise with respect to FIGS. 7 and 8, the cam pin 129 encounters first the nesting ramp 147. In pressing engagement with the nesting ramp 147, the cam pin 129 slides along it. The latch plate 118 now rotates in the same sense, that is, counterclockwise in the second direction, until the cam pin 129 encounters the lifting ramp 146. When the cam pin 129 slides along the lifting ramp 146, the latch plate 118 begins to rotate in an opposite sense under the influence of the extension spring 113. Eventually, the cam pin 129 moves out of contact with the lifting ramp 146 as shown in FIG. 7. When this happens, the force exerted by the extension spring 113 has no resistance other than the seating force on the housing 115.

With particular reference to FIGS. 7 and 8, a bell crank lever 120 is pivotally mounted on the crank shaft intermediate its extension in opposite radial directions from the crank shaft 110. At one end of this extension is a latch end 151. The latch end 151 is received through the opening 119 of the latch plate 118 when the latch plate 118 is in a latch position as shown in FIG. 7. At the latch end 151, a cam notch 152 partially surrounds the cam pin 129. The cam notch 152 is of a sufficient radial dimension to allow the cam pin 129 to rotate along its camming path within the cam notch 152, before coming into contact with an edge of the cam notch 152—for example, in the embodiment shown in FIGS. 7 and 8, the cam pin 129 appears to have a diameter that is less than the radius of the cam notch 152. Also, at the latch end 151 of the bell crank lever 120 is a latch notch 153. The latch notch 153 is configured to receive the latch edge 142 of the latch plate 118 to allow an intimate contact between the latch plate 118 and the bell crank 120 within the latch notch 153. This intimate contact takes place when the latch plate 118 is in a latch position and prevents the bell crank 120 from rotating in the first direction.

At the opposite end of the bell crank's extension is a connection end 154 for connecting the bell crank 120 to the clutch rod 125. This connection is facilitated by a dog end 156 which is received in an opening in the connection end 154 of the bell crank lever 120. The dog end 156 of the clutch rod 125 is held in position by a cotter pin 157.

The operation of the linear control latch in cooperation with the PTO system will now be explained. When the PTO control lever 105 is rotated in a first direction, it causes concomitant rotation of the slider 126 with the cam pin 129 attached thereto. The cam pin 129 rotates, within the cam notch 152, encountering the lifting ramp 146 before it comes into contact with the edge of the cam notch 152. As a result of the pressing engagement of the cam pin 129 with the lifting ramp 146, the latch plate 118 is pivoted from its latch position, in which it had prevented the bell crank lever 120 from rotating in the first direction. The cam pin 129 eventually comes into contact with the cam notch 152, and, together with the slider 126 and the cam pin 129, the bell crank 120 rotates as long as the PTO control lever 105 is rotated, until the first edge of the slider 126 comes into contact with the latch edge 142 of the opening 119 of the latch plate 118.

When the PTO control lever 105 is rotated in the second direction, it causes concomitant rotation of the slider 126 and the cam pin 129. The cam pin 129 encounters the nesting ramp 147 and presses against it. As the cam pin 129 slides against the nesting ramp 147, it rotates the latch plate 118 in the same sense as the cam pin 129 is rotated until the cam pin 129 encounters the lifting ramp 146, whereupon the cam pin 129 slides along the lifting ramp 146, allowing the latch plate 118 in the sense opposite the second direction under the influence of the extension spring 113. The cam pin 129 continues to rotate until it moves out of contact with the lifting ramp 146.

Moving the PTO lever 105 in the first direction moves the clutch rod 125 in a direction to rotate the idler arm 130 to an "off" position, until the idler arm 130 is in the position shown in FIG. 4, and the PTO control lever 105 is in the position shown in FIG. 8. Rotating the PTO lever 105 in the second direction moves the idler arm 130 to the "on" position shown in FIG. 3. The PTO lever 105 is then in the position shown in FIG. 7.

The present invention teaches an advantageous method of linearly controlling the power take-off from a tractor drive so as to supply power to an implement attached to a tractor 10, for example, tractor 10 in FIG. 1. Starting with the idler arm 130 in an "on" position, as shown in FIG. 3, the method requires initially rotating the crank 110 in a first rotation direction, that is, the direction that would move the crank 110 in FIG. 7 to the orientation of the crank 110 in FIG. 8. Concomitantly, the rotational motion of the crank shaft 111 is translated to an unlatching motion of the latch plate 118. The method requires continuing to rotate the crank 110 in the first rotational direction to cause the continued rotation of the crank shaft 111 in the same direction. Following these initial steps, the rotational motion of the crank shaft 111 in the first rotational direction is translated to a crank arm or bell crank 120. At the same time as the rotational motion of the crank shaft 111 is imparted to the crank arm 120, a linear acceleration is imparted in a first sense to the clutch rod 125 which is pivotally connected to the crank arm 120 at a distance remote from the crank shaft 111. This acceleration is the result of the conservation of angular momentum of the clutch rod 125 with respect to the rotating crank arm; thus, the accelerating force is concomitant with the step of translating the rotational motion to the crank arm 120. With the acceleration of the clutch rod 125, the idler arm 130, carrying the idler pulley 145, is rotated away from the position shown in FIG. 3 to the position shown in FIG. 4.

The method further teaches that, once the idler pulley 145 is in the "off" position as shown in FIG. 4, the PTO control lever 105 may be rotated from its orientation shown in FIG. 8 to its orientation shown in FIG. 7. As the crank 115 is rotated in the second rotational direction, it causes a second rotational motion of the crank shaft 111 in the second rotational direction. The rotational motion of the crank shaft 111 in the second rotational direction is transferred to an unlatching motion of the latch plate 118. This unlatching motion is followed by a latching motion of the latch plate 118. Continuing to rotate the crank 110 in the second direction causes continuing rotation of the crank shaft 111 in the second direction. Subsequent to these steps, moving from the "off" to the "on" positions, the rotational motion of the crank shaft 111 is translated to a rotational motion in the crank arm 120 in this second rotational direction. Again, a linear acceleration is imparted, this time in a second sense, to the clutch rod 125, which is pivotally connected to the crank arm 120. The step of imparting a linear acceleration with a second sense to the clutch rod 120 has the consequence of rotating the idler arm 130 carrying the idler pulley 145 from the position shown in FIG. 4 to the position shown in FIG. 3.

It will be apparent to those skilled in the art that the foregoing disclosure is exemplary in nature rather than limiting, the invention being limited only by the appended claims.

I claim:

1. A linear control latch assembly for controlling a clutching operation to a power take-off system that includes:
   driving means for producing kinetic mechanical energy;
   power take-off means for taking off said kinetic mechanical energy from said driving means, when a union between said power take-off means and said driving means is effected;
   clutch means for effecting said union when said clutch means is actuated by a force having a first sense along a linear path and for breaking said union when said clutch means is actuated by a force having a second, opposite sense along said linear path; and
   linear actuator means for imparting a force with said first sense along said linear path when a cranking force having a first rotational sense is imparted to said linear actuator and for imparting a force with said second sense along said linear path when a cranking force having a second rotational sense is imparted to said linear actuator,
   said linear control latch assembly comprising:
   cranking means for supplying rotational motion in said first and second rotational senses, said rotational motion having a first limit and a second limit bounding an acute crank angle;
   crank arm means for imparting said cranking force to said linear actuator when said rotational motion is received by said crank arm means after a delay caused by lost motion between said cranking means and said crank arm means;
   cam means for immediately translating said rotational motion from said cranking means to an unlatching motion followed by a latching motion and, after a delay, imparting said rotational motion to said crank arm means;
   latch means for receiving said unlatching and latching motions, said latch means impeding said rotational motion in said second sense when said rotational motion in said first sense has reached said first limit and said latch means resisting said rotational motion in said first sense when said rotational motion in said second sense has reached said second limit.

2. A linear control latch as described in claim 1 wherein said cranking means includes a crank rigidly attached to a crank shaft and said crank arm means is a lever pivotally attached to said crank shaft.

3. A linear control latch as described in claim 2 wherein said cam means includes an extension from said cam shaft, rigidly connected thereto, said extension having a camming part which encounters a cam follower integral with a part of said latch means and wherein said latch means includes a latch notch in said crank arm means, said latch notch configured to receive a latch edge.

4. A linear control latch as described in claim 3 wherein said extension from said cam shaft is a slider and said camming part is a cam pin perpendicularly connected to said slider, so that said cam pin rotates in a camming path about said crank shaft concomitantly with a rotation of said slider.

5. A linear control latch as described in claim 4 wherein said crank arm means that is a lever is a bell crank lever pivotably mounted on said crank shaft and extending in opposite radial directions therefrom, said bell crank lever having a connection end, for connecting said bell crank lever to said linear actuator means, and a latch end, which includes said latch notch and a cam notch, said cam notch partially surrounding said cam pin and having sufficient dimensions to allow said cam pin to rotate within said notch before coming into contact with an edge of said notch whereupon said bell crank lever rotates with said cam pin.

6. A linear control latch as described in claim 4 wherein said cam follower is a lifting ramp and a nesting ramp aligned end to end along a cam follower path on a latch plate generally extending in a plane at a location remote from said crank shaft and adjacent to said cam pin, said latch plate having two ends, one end having a pivot axis, about which said latch plate is rotatable, said pivot axis being parallel to said cam pin, said latch plate also having a rectangular opening with said latch edge and a stop edge, said edges generally parallel to each other and said pivot axis, said opening receiving therethrough an upper portion of said slider so that said slider is rotatable in a first direction only until a first edge of said slider contacts said latch edge and said slider is rotatable in a second direction only until a second edge of said slider contacts said stop edge, said cam follower path situated beside said opening and generally tangential to said camming path, both said lifting ramp and said nesting ramp angled outwardly from said plane generally toward said crank shaft in an arrangement in which said lifting ramp and said nesting ramp are joined end to end away from said plane, so that, when said cam pin rotates about said crank shaft in said first direction and said latch plate is in a latch position, said cam pin encounters said lifting ramp and slides along said lifting ramp in pressing engagement therewith, rotating said latch plate from said latch position, said latch plate rotating in a sense opposite said first direction until said cam pin encounters said nesting ramp, whereupon said cam pin slides along said nesting ramp, allowing said latch plate to rotate in the sense of said first direction, until said first edge of said slider encounters said latch edge and, when said cam pin rotates in said second direction, said cam pin encounters said nesting ramp and, in pressing engagement therewith, slides along said nesting ramp, rotating said latch plate in the sense of said second direction until said cam pin encounters said lifting ramp, whereupon said cam pin slides along said lifting ramp, allowing said latch plate to rotate in a sense opposite said second direction, until said cam pin moves out of contact with said lifting ramp.

7. A linear control latch as described in claim 6 wherein said latch plate is biased toward a latch position.

8. A linear control latch as described in claim 7 wherein said latch plate is biased toward a latch position by an extension spring having one end of said extension spring anchored to the other end of said plate and the other end of said extension spring anchored to a housing.

9. A linear control latch as described in claim 7 wherein said crank arm means that is a lever is a bell crank lever pivotably mounted on said crank shaft and extending in opposite radial directions therefrom, said bell crank lever having a connection end, for connecting said bell crank lever to said linear actuator means, and a latch end receivable through said opening of said latch plate when said latch plate is in said latch position, said latch end including said latch notch which receives said latch edge when said latch plate is in said latch position to prevent said bell crank lever from rotating in said first direction, and a cam notch which is disposed at said latch end at a location closer to said pivot axis than said latch notch and which partially surrounds said cam pin with sufficient tolerance to allow said cam pin to rotate within said notch before coming into contact with an edge of said notch whereupon said bell crank lever rotates with said cam pin, whereby, when said crank is rotated in said first direction causing concomitant rotation of said slider and said cam pin, said cam pin rotating within said cam notch, said latch plate is pivoted from said latch position by said pressing engagement of said cam pin, so that said bell crank lever is not prevented from rotating in said first direction, said cam pin eventually coming into contact with an edge of said cam notch and, together with said slider, said cam pin and said bell crank lever rotate, as long as said crank is rotated, until said first edge of said slider comes into contact with said latch edge, and, when said crank is rotated in said second direction causing concomitant rotation of said slider and said cam pin, said cam pin rotating within said cam notch, said latch plate is rotated in the rotational sense of said second direction by said pressing engagement of said cam pin, said cam pin eventually coming in contact with an edge of said cam notch whereupon together said slider, said cam pin, and said bell crank lever continue to rotate, as long as said crank is rotated, said cam pin eventually coming out of contact with said latch plate, until said second edge of said slider comes into contact with said stop edge.

10. A linear control assembly, in which there is a linear control latch, comprising:
a PTO control lever including
a crank shaft pivotally mounted along an axis of extension and
a crank rigidly connected to said crank shaft at one position along said axis of extension and rotatable thereabout to produce a pivoting of said crank shaft;
a slider rigidly connected to said crank shaft at another position along said axis of extension and rotatable thereabout in response to said pivoting of said crank shaft, said slider extending radially of said axis of extension to an upper portion having a first and second edge;
a cam pin perpendicularly connected to said slider at a position remote from said crank shaft, so that said cam pin rotates in a camming path about said crank shaft concomitantly with a rotation of said slider;
a latch plate generally extending in a plane at a location remote from said crank shaft and adjacent to said cam pin, said latch plate having
two ends, one end having a pivot axis, about which said latch plate is rotatable, said pivot axis being parallel to said cam pin,
a rectangular opening with a stop edge and a latch edge, said edges generally parallel to each other an said pivot axis, said opening receiving therethrough said upper portion of said slider so that said slider is rotatably in a first direction only until said first edge of said slider contacts said latch edge and said slider is rotatable in a second direction only until said second edge of said slider contacts said stop edge, and
a lifting ramp and a nesting ramp aligned end to end along a cam follower path on said plate, beside said opening, said cam follower path generally tangential to said camming path, both said lifting ramp and said nesting ramp angled outwardly from said plane generally toward said crank shaft in an arrangement in which said lifting ramp and said nesting ramp are joined end to end away from said plane, so that, when said cam pin rotates about said crank shaft in said first direction and said latch plate is in a latch position, said cam pin encounters said lifting ramp and, slides along said lifting ramp in pressing engagement therewith, rotating said latch plate from said latch position, said latch plate rotating in a sense opposite said first direction, until said cam pin encounters said nesting ramp, whereupon said cam pin slides along said nesting ramp, allowing said latch plate to rotate in the sense of said first direction, until said first edge of said slider contacts said latch edge and, when said cam pin rotates in said second direction, said cam pin encounters said nesting ramp and, in pressing engagement therewith, slides along said nesting ramp, rotating said latch plate in the sense of said second direction until said cam pin encounters said lifting ramp, whereupon said cam pin slides along said lifting ramp, allowing said latch plate to rotate in a sense opposite said second direction, until said cam pin moves out of contact with said lifting ramp;
a bell crank lever pivotably mounted on said crank shaft and extending in opposite radial directions therefrom, said bell crank lever having
a connection end for connecting said bell crank lever to a clutch linkage and
a latch end receivable through said opening of said latch plate when said latch plate is in said latch position, said latch end including
a cam notch partially surrounding said cam pin and having sufficient dimensions to allow said cam pin to rotate within said notch before coming into contact with an edge of said notch whereupon said bell crank lever rotates with said cam pin and
a latch notch configured to receive said latch edge in intimate contact with an edge of said latch notch when said latch plate is in a latch position so that said bell crank lever is prevented from rotating in said first direction, said latch notch disposed at said latch end at a location more remote from said pivot axis than said cam notch,
whereby, when said PTO control lever is rotated in said first direction causing concomitant rotation of said slider and said cam pin, said cam pin rotating within said cam notch, said latch plate is pivoted from said latch position by said pressing engagement of said cam pin, so that said bell crank lever is not prevented from rotating in said first direction, said cam pin eventually coming into contact with an edge of said cam notch and together said slider, said cam pin, and said bell crank lever rotate, as long as said PTO control lever is rotated, until said first edge of said slider comes into contact with said latch edge, and, when said PTO control lever is rotated in said second direction causing concomitant rotation of said slider and said cam pin, said cam pin rotating within said cam notch, said latch plate is rotated in the rotational sense of said second direction by said pressing engagement of said cam pin, said cam pin eventually coming in contact with an edge of said cam notch whereupon together said slider, said cam pin, and said bell crank lever continue to rotate, as long as said PTO lever is rotated, said cam pin eventually coming out of contact with said latch plate when said latch plate is in said latch position, until said second edge of said slider comes into contact with said stop edge.

11. A linear control assembly as described in claim 10 wherein said latch plate is biased toward said latch position.

12. A linear control latch as described in claim 11 wherein said latch plate is biased toward said latch position by an extension spring having one end of said extension spring anchored to the other end of said plate and the other end of said extension spring anchored to a housing.

13. A method of linearly controlling power take-off from a tractor drive to supply power to an implement attached to the tractor when a power takeoff system is in an "on" condition, including isolating said power from said power take-off system when said power take-off system is in an "off" condition, the method comprising:

initially rotating a crank in a first rotational direction, when said power take-off is in an "on" condition, to cause a rotational motion of a crank shaft in said first rotational direction;

firstly translating said rotational motion of said crank shaft in said first rotational direction to an unlatching motion a latch plate, said latch plate holding one portion of a crank arm from rotating in said first direction, said firstly translating step concomitant with said cranking step;

continuing to rotate said crank in said first rotational direction to cause continued rotation of said crank shaft in said first rotational direction;

secondly translating said rotational motion of said crank shaft in said first rotational direction to said crank arm, said secondly translating step following said unlatching step;

imparting a linear acceleration having a first sense to a rod pivotally connected to said crank arm at a distance remote from said crank shaft, said acceleration the result of the conservation of angular momentum of said rod with respect to said rotating crank arm and, therefore, said imparting step concomitant with said secondly translating step;

rotating an arm carrying an idler pulley about an axis of rotation, said idler pulley being concomitantly rotated away from a position in which said pulley is in pressing engagement with a belt, leaving said belt loosely trained around a power take-off pulley and a drive pulley, said rotating step facilitated by said linear acceleration of said rod, said rod pivotally connected to said arm at a distance remote form said axis of rotation;

rotating a crank in a second rotational direction, when said power take-off is in an "off" condition, to cause a rotational motion of a crank shaft in said second rotational direction;

firstly translating said rotational motion of said crank shaft in said second rotational direction to an unlatching motion followed by a latching motion of said latch plate, said latch plate resisting against said one portion of said crank arm from rotating in said second direction, said step of firstly translating in said second rotational direction concomitant with said cranking step;

continuing to rotate said crank in said second rotational direction to cause continued rotation of said crank shaft in said second rotational direction;

secondly translating said rotational motion of said crank shaft in said second rotational direction to said crank arm, said secondly translating in said second rotational direction step following said step of firstly translating said rotational motion in said second rotational direction;

imparting a linear acceleration having a second sense to a rod pivotally connected to said crank arm at a distance remote from said crank shaft, said acceleration the result of the conservation of angular momentum of said rod with respect to said rotating arm and, therefore, said step of imparting a linear acceleration having a second sense concomitant with said secondly translating step;

rotating said arm carrying an idler pulley about an axis of rotation, said idler pulley being concomitantly rotated to a position in which said pulley is in pressing engagement with a belt, causing said belt to be tautly trained around a power take-off assembly and a drive pulley, said rotating step facilitated by said linear acceleration of said rod.

* * * * *